(12) United States Patent
Zhu et al.

(10) Patent No.: US 9,874,673 B2
(45) Date of Patent: Jan. 23, 2018

(54) BACKLIGHT MODULE AND DISPLAY DEVICE

(71) Applicant: BOE TECHNOLOGY GROUP CO., LTD., Beijing (CN)

(72) Inventors: Lin Zhu, Beijing (CN); Yanbing Wu, Beijing (CN); Hao Wang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 14/785,762

(22) PCT Filed: Mar. 20, 2015

(86) PCT No.: PCT/CN2015/074663
§ 371 (c)(1),
(2) Date: Oct. 20, 2015

(87) PCT Pub. No.: WO2016/070544
PCT Pub. Date: May 12, 2016

(65) Prior Publication Data
US 2016/0306094 A1    Oct. 20, 2016

(30) Foreign Application Priority Data
Nov. 3, 2014 (CN) .......................... 2014 1 0608754

(51) Int. Cl.
*G02F 1/1335* (2006.01)
*F21V 8/00* (2006.01)

(52) U.S. Cl.
CPC .......... *G02B 6/0021* (2013.01); *G02B 6/003* (2013.01); *G02B 6/0055* (2013.01); *G02B 6/0068* (2013.01)

(58) Field of Classification Search
CPC ................. G02F 1/133615; G02B 6/0038
USPC ................. 349/65; 362/612, 615, 626
See application file for complete search history.

(56) References Cited

U.S. PATENT DOCUMENTS

| 7,139,048 B2* | 11/2006 | Han | G02B 6/0021 |
| | | | 349/61 |
| 2006/0050532 A1* | 3/2006 | Stadtwald-Klenke | |
| | | | G02B 6/0036 |
| | | | 362/612 |
| 2012/0013811 A1* | 1/2012 | Shimizu | G02B 6/0016 |
| | | | 348/739 |

FOREIGN PATENT DOCUMENTS

| CN | 1967320 A | 5/2007 |
| CN | 201078649 Y | 6/2008 |
| CN | 102033362 A | 4/2011 |
| CN | 102279436 A | 12/2011 |
| CN | 104317101 A | 1/2015 |

(Continued)

OTHER PUBLICATIONS

International Search Report of PCT/2015/074663 in Chinese, dated Jul. 15, 2015 with English translation.

(Continued)

*Primary Examiner* — Thanh-Nhan P Nguyen
(74) *Attorney, Agent, or Firm* — Collard & Roe, P.C.

(57) ABSTRACT

Embodiments of the disclosure provide a backlight module and display device. The backlight module comprises: a light guide plate (1), a PCB substrate (2) disposed at a side of the light guide plate (1); wherein a side of the PCB substrate (2) facing the light guide plate (1) is provided with a plurality of groups of light source devices (3); a side of the light guide plate (1) facing the PCB substrate (2) is provided with a plurality of recesses for accommodating the light source devices; a plurality of projections (111) disposed on an inner surface of the recess (11).

16 Claims, 3 Drawing Sheets

(56) References Cited

FOREIGN PATENT DOCUMENTS

| JP | 2005-10436 A | 1/2005 |
| JP | 2007-220369 A | 8/2007 |
| TW | 201215968 A | 4/2012 |
| WO | 2012/030085 A1 | 3/2012 |

OTHER PUBLICATIONS

Notice of Transmittal of the International Search Report of PCT/2015/074663 in Chinese, dated Jul. 15, 2015.
Written Opinion of the International Searching Authority of PCT/2015/074663 in Chinese, dated Jul. 15, 2015 with English translation.
Chinese Office Action in Chinese Application No. 201410608754.5, dated Aug. 22, 2016 with English translation.
Second Chinese Office Action in Chinese Application No. 201410608754.5, dated Dec. 8, 2016 with English translation.
Third Chinese Office Action in Chinese Application No. 201410608754.5, dated Apr. 12, 2017 with English translation.

\* cited by examiner

BACKLIGHT MODULE AND DISPLAY DEVICE

CROSS REFERENCE TO RELATED APPLICATIONS

This application is the National Stage of PCT/CN2015/074663 filed on Mar. 20, 2015, which claims priority under 35 U.S.C. § 119 of Chinese Application No. 201410608754.5 filed on Nov. 3, 2014, the disclosure of which is incorporated by reference.

TECHNICAL FIELD

Embodiments of the present disclosure relate to a backlight module and a display device

BACKGROUND

At present, backlight modules are utilized in most liquid crystal displays to provide lights to the display panel thereof, and a light guide plate is used in a backlight module to guide the lights uniformly to display panels.

Conventional light guide plates have a shape of board, in which the lost ratio of lights is approximately 30%. Moreover, light can be easily leaked from the side of the light guide plates, therefore additional black tapes are required to shield light leaking area, resulting in lower light output ratio, thus affecting the display quality.

In addition, there are no appropriate spaces for placing light source devices on the board-shaped light guide plates, thus restricting the design of narrow framed products.

SUMMARY

At least one embodiment of the disclosure provides a backlight module, comprising:
  a light guide plate; and
  a PCB substrate, placed at a side of the light guide plate, the PCB substrates provided a plurality of groups of light source devices, each group of light source devices comprising at least one light source device;
  a side of the light guide plate facing the PCB substrates provided with a plurality of recesses for accommodating the light source devices; and
  an inner surface of the recess provided with a plurality of projections formed thereon.

According to one embodiment of the present disclosure, the projections are made of the same material as the light guide plates, and directly formed on the inner surface of the recesses.

According to one embodiment of the present disclosure, the projections are formed as lens film, and disposed on the inner surface of the recesses.

According to one embodiment of the present disclosure, the cross sections of the projections are polygon or arch.

According to one embodiment of the present disclosure, the polygon can be a triangle or a quadrangle.

According to one embodiment of the present disclosure, the arch can be semicircular.

According to one embodiment of the present disclosure, the projections are disposed continuously or in interval.

According to one embodiment of the present disclosure, the quantity of the recesses is equivalent to that of the groups of the light source devices.

According to one embodiment of the present disclosure, the light source device is separated from the inner surface of the recess at a predetermined distance.

At least one embodiment of the disclosure also provides a display device, comprising the backlight module as mentioned above.

According to one embodiment of the present disclosure, the display device further comprises an upper substrate and a lower substrate, which are cell-assembled; an upper polarizer, configured to be disposed on the upper surface of the upper substrate; a color film configured to be disposed on the lower surface of the upper substrate; a wire grid polarizing film and an array layer, disposed on the inner surface of the lower substrate; two orientation layers disposed on the inner surface of the upper and lower substrates, respectively; a liquid crystal layer sandwiched between the upper substrate and the lower substrate; seal agent sealing peripheries of the liquid crystal layer; and nanoparticles, disposed on the outer surface of the lower substrate, and having reflective plates formed on the surface thereof; wherein the light guide plate is configured to act as a lower substrate.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
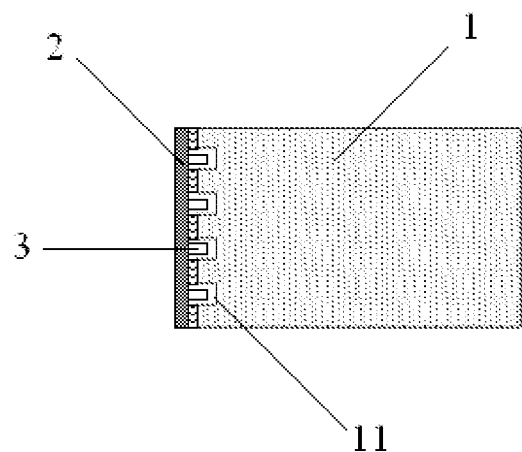
FIG. 1 is a schematic structure view of a backlight module according to the first embodiment of the disclosure.
Figure 2:
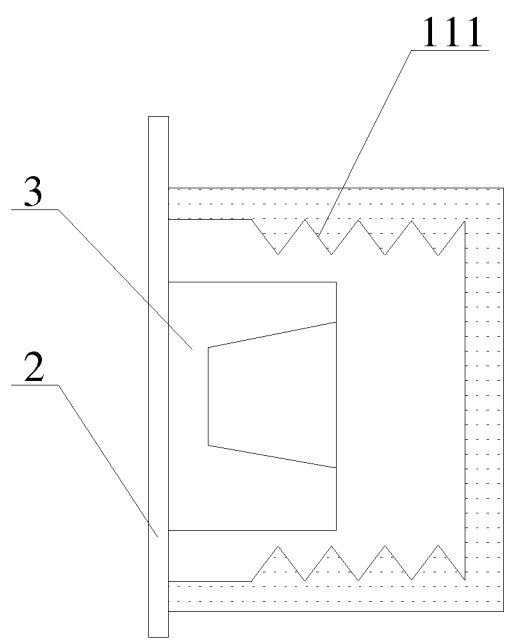
FIG. 2 is a schematic structure view of triangle projections of a backlight module according to the first embodiment of the disclosure.
Figure 3:
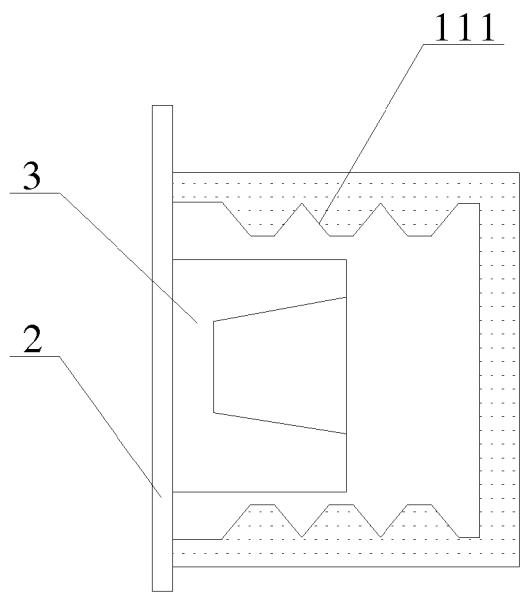
FIG. 3 is a schematic structure view of trapezoidal projections of a backlight module according to the first embodiment of the disclosure.
Figure 4:
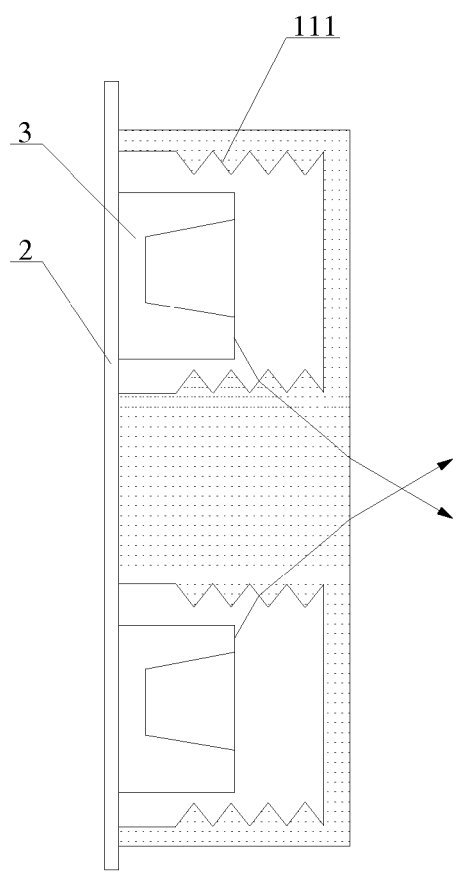
FIG. 4 is a schematic view of the reflections where the lights pass through the projections in one embodiment of the disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

The First Embodiment

An embodiment of the disclosure provides a backlight module, as illustrated in FIGS. 1 to 4, the backlight module comprising:

a light guide plate 1 and a PCB substrate 2, the PCB substrate disposed at a side of the light guide plate 1, and provided with a plurality of groups of light source devices 3 formed thereon;

a side of light guide plate 1 facing PCB substrate 2 provided with a plurality of recesses 11, which are configured to accommodate the groups of light source device 3; the inner surface of the recesses 11 provided with a plurality of projections 111.

Each group of light source devices 3 comprises at least one light source device, the accompanying figures illustrate the group of light source devices where one group comprises one light source device.

The projection 111 is made of the same material as the light guide plate 1, and directly formed on the inner surface of the recess 11. That is, when forming recess 11 in the light guide plate 1, the shape of projection 111 is formed at the same time.

A side of the light guide plate according to the embodiment is configured to have recessed structure for accommodating the light source devices, the space occupied by the light source devices can be saved to the most extend, thus realizing the design of narrow framed products.

In addition, the inner surface of the recess 11 according to the embodiment is provided with a plurality of projections 111, light emitted from the light source devices will be reflected when passing through these projections, light emitted from the sides of the light source devices can then be utilized, thus improving the utilization ratio of the light, furthermore achieving required luminance via less light source devices, effectively reducing load of heat dissipation of light source devices while saving energy, eventually reducing the interior temperature of the optical modules, as well as prolonging the service life of product.

It should be noted that, the quantity of the projections can be determined according to actual demands, the structure can be polygon or arch, and of course, can be any other geometric shapes.

The polygon of the embodiment of the disclosure can be triangle and quadrilateral, the quadrilateral can be rectangular, trapezoidal or other irregular quadrangles; the arch can be semi-circular, semi-elliptical, or other irregular curves.

The projection 111 can be disposed continuously or in intervals on the inner surface of the recesses, both of these two arrangements lead more reflections when lights passing through, thus improve the output ratio of the light.

In addition, the group of the light source devices according to the embodiment includes at least one LED light, and of course, besides which, other light-emitting components can also be utilized in the group of light source devices.

In order to accommodate all the groups of light source devices, quantity of recesses is set equivalent to the groups of light source devices.

To ensure the light emitted from light source devices can be reflected on the projections, as well as provide better heat dissipation for the group of light source devices, the group of light source devices is separated from the inner surface of the recesses at a predetermined distance.

The Second Embodiment

Figure 5:
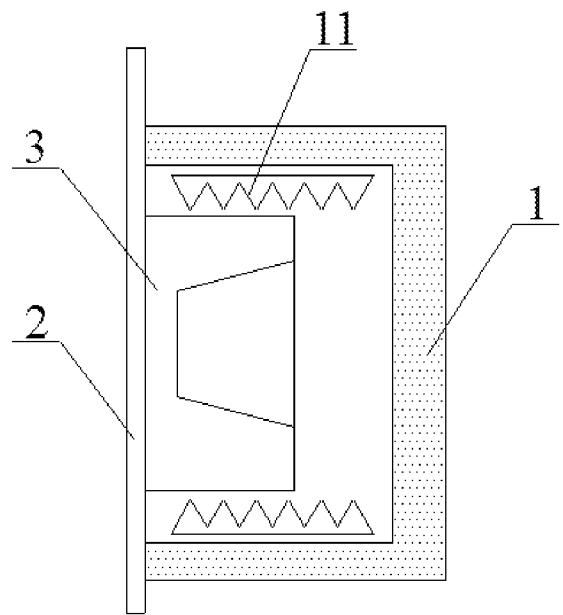
FIG. 5 is a schematic structure view of the triangle lens film projection of a backlight module according to the second embodiment of the disclosure.
Figure 6:
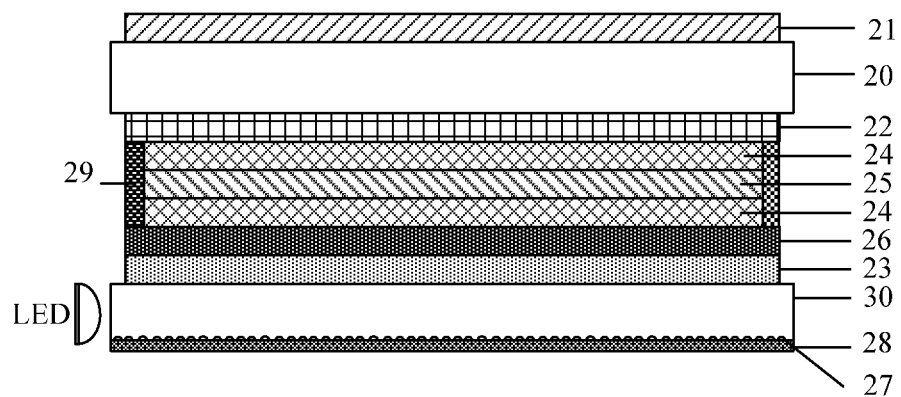
FIG. 6 is a schematic structure view of the display device according to one embodiment of the disclosure.

FIG. 5 illustrates the structure according to the second embodiment of the disclosure, the difference between the backlight module according to the second embodiment and the first is that the projections 111 are formed by lens films and the lens films are adhered to the inner surface of recesses 11. That is, it only needs to form recesses 11 on light guide plate 1, and dispose the lens film projections on the inner surface of the recesses through adhering lens film.

Similarly, the lens film can be polygon or arch, the polygon can be triangular and quadrilateral, and the quadrilateral can be rectangular, trapezoidal or other irregular quadrangles.

The lens film can use different shapes to form different projections, so as to produce more reflections and improve the effectiveness of the light.

At least one embodiment of the disclosure also provides a display device, comprising the backlight module described above. The display device further comprises an upper substrate 20 and a lower substrate 30 which are cell-assembled; an upper polarizer 21 disposed on the upper surface of the upper substrate 20; a color film 22 disposed on the lower surface of the upper substrate 20; a wire grid polarizing film 23 and an array layer 26 disposed on the inner surface of the lower substrate; an alignment layer 24 disposed on the inner surfaces of the upper and lower substrates, respectively; a liquid crystal layer 25 sandwiched in between the upper substrate and the lower substrate; the seal agent 29 sealing the peripheries of the liquid crystal layer 25; and nanoparticles 27 disposed on the outer surface of the lower substrate and having a reflection plate 28 formed on the surface thereof; wherein the light guide plate is configured to act as the lower substrate.

In such a display device, the light guide plate acts as the lower substrate and the light guide plate, and light is polarized by using wire-grid polarizer instead of conventional attached polarizer, which solves the excessive thickness of conventional display devices, and achieves the design of ultra-thin display devices.

This display device can be a liquid crystal display (LCD), an LCD monitor, a tablet PC, a laptop, an electronic book and any other electronic product.

The embodiments of the disclosure provide a backlight module and a display device, accommodating light source devices by providing a plurality of recesses at one side of the light guide plate, and by disposing multiple projections on the inner surface of the recesses, utilizes the light emitted from the side of light source devices to improve the utilization ratio of lights, so as to obtain required luminance via less light source devices, effectively reducing load of heat dissipation of the light source devices while saving energy, eventually reducing the interior temperature of the optical modules, and prolonging the service life of products. In addition, by providing recesses which can accommodate groups of light source devices, space occupied by the light source devices can be further saved, thus achieving the design of narrow framed products.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201410608754.5 filed on Nov. 3, 2014, the disclosure of which is hereby entirely incorporated by reference.

The invention claimed is:

1. A backlight module, comprising:
a light guide plate;
a PCB substrate, disposed at a side of the light guide plate, and provided with a plurality of groups of light source devices;
wherein a side of the light guide plate facing the PCB substrate is provided with a plurality of recesses for accommodating the light source devices; and a plurality of projections are disposed on an inner surface of the recesses and formed as lens films.

2. The backlight module according to claim 1, wherein the projections are made of the same material as the light guide plate and directly formed on the inner surface of the recesses.

3. The backlight module according to claim 2, wherein the projections are disposed continuously or in interval.

4. The backlight module according to claim 2, wherein quantity of the recesses is equivalent to the groups of the light source devices.

5. The backlight module according to claim 2, wherein the light source devices are disposed away from the inner surface of the recesses at a predetermined distance.

6. The backlight module according to claim 1, wherein the projections are disposed continuously or in interval.

7. The backlight module according to claim 1, wherein quantity of the recesses is equivalent to that of the groups of the light source devices.

8. The backlight module according to claim 1, wherein the light source devices are disposed away from the inner surface of the recesses at a predetermined distance.

9. A display device comprising the backlight module according to claim 1.

10. The display device according to claim 9, further comprising:
    an upper substrate and a lower substrate which are cell-assembled;
    an upper polarizer disposed on the upper surface of the upper substrate;
    a color film disposed on the lower surface of the upper substrate;
    a wire grid polarizing film and an array layer disposed on the inner surface of the lower substrate;
    an orientation layer disposed on the inner surface of the upper and lower substrate, respectively;
    a liquid crystal layer sandwiched in between the upper substrate and the lower substrate;
    seal agent for sealing peripheries of the liquid crystal layer; and
    nanoparticles disposed on the outer surface of the lower substrate and provided with a reflection plate on surface thereof; wherein the light guide plate configured to act as the lower substrate.

11. A backlight module, comprising:
    a light guide plate;
    a PCB substrate, disposed at a side of the light guide plate, and provided with a plurality of groups of light source devices;
    wherein a side of the light guide plate facing the PCB substrate is provided with a plurality of recesses for accommodating the light source devices; and a plurality of projections are disposed on an inner surface of the recesses and the cross section of the projections is semicircular.

12. The backlight module according to claim 11, wherein the projections are disposed continuously or in interval.

13. The backlight module according to claim 11, wherein quantity of the recesses is equivalent to that of the groups of the light source devices.

14. The backlight module according to claim 11, wherein the light source devices are disposed away from the inner surface of the recesses at a predetermined distance.

15. A display device comprising the backlight module according to claim 11.

16. The display device according to claim 15, further comprising:
    an upper substrate and a lower substrate which are cell-assembled;
    an upper polarizer disposed on the upper surface of the upper substrate;
    a color film disposed on the lower surface of the upper substrate;
    a wire grid polarizing film and an array layer disposed on the inner surface of the lower substrate;
    an orientation layer disposed on the inner surface of the upper and lower substrate, respectively;
    a liquid crystal layer sandwiched in between the upper substrate and the lower substrate;
    seal agent for sealing peripheries of the liquid crystal layer; and
    nanoparticles disposed on the outer surface of the lower substrate and provided with a reflection plate on surface thereof; wherein the light guide plate configured to act as the lower substrate.

* * * * *